United States Patent
Nakash

(10) Patent No.: US 7,388,828 B2
(45) Date of Patent: Jun. 17, 2008

(54) METHOD FOR REROUTING MPLS TRAFFIC IN RING NETWORKS

(75) Inventor: Shaul Nakash, Kfar Sava (IL)

(73) Assignee: ECI Telecom Ltd., Petach Tikva (IL)

( * ) Notice: Subject to any disclaimer, the term of this patent is extended or adjusted under 35 U.S.C. 154(b) by 656 days.

(21) Appl. No.: 10/975,921

(22) Filed: Oct. 29, 2004

(65) Prior Publication Data

US 2005/0094554 A1 May 5, 2005

(30) Foreign Application Priority Data

Oct. 29, 2003 (IL) .................................... 158656

(51) Int. Cl.
*H04J 1/16* (2006.01)
*H04L 12/28* (2006.01)

(52) U.S. Cl. .................. 370/218; 370/222; 370/392
(58) Field of Classification Search ................. None
See application file for complete search history.

(56) References Cited

U.S. PATENT DOCUMENTS

| | | | |
|---|---|---|---|
| 6,490,244 B1 * | 12/2002 | Pegrum et al. | 370/216 |
| 6,532,088 B1 * | 3/2003 | Dantu et al. | 370/223 |
| 7,167,444 B1 * | 1/2007 | Afferton | 370/222 |
| 2002/0060985 A1 | 5/2002 | Lee et al. | |
| 2002/0093954 A1 | 7/2002 | Weil et al. | |
| 2002/0141453 A1 * | 10/2002 | Ghani | 370/535 |
| 2003/0012129 A1 | 1/2003 | Lee | |
| 2003/0108029 A1 | 6/2003 | Behzadi | |
| 2004/0010617 A1 * | 1/2004 | Akahane et al. | 709/243 |
| 2006/0078332 A1 * | 4/2006 | Fang et al. | 398/19 |

OTHER PUBLICATIONS

Stamatelakis et al., "IP Layer Restoration and Network Planning Based on Virtual Protection Cycles," IEEE J. on Selected Areas in Communications, vol. 18, No. 10, Oct. 2000.

* cited by examiner

*Primary Examiner*—Andrew C. Lee
(74) *Attorney, Agent, or Firm*—Browdy and Neimark

(57) ABSTRACT

A method is described for fast rerouting, in case of a fault, packets of MPLS traffic in a ring-like network configuration, where the MPLS traffic is formed by one or more Label Switched Paths (LSPs) entitled to protection. The method comprises rerouting the MPLS packets to a protection path in the ring, providing the rerouted MPLS packets with additional labels to their respective label stacks, and then detecting the additional labels at network nodes included in the protection path. Detection of the additional labels further allows determining egress nodes of the rerouted MPLS packets and outputting the rerouted MPLS packets at their corresponding egress points from the protection path.

11 Claims, 4 Drawing Sheets

METHOD FOR REROUTING MPLS TRAFFIC IN RING NETWORKS

FIELD OF THE INVENTION

The present invention relates to the field of communications, more particularly to the field of rerouting/protecting of so-called MPLS (multi-protocol label switching) traffic in networks comprising rings.

BACKGROUND OF THE INVENTION

The problem of rerouting/protecting traffic in communication networks is one of the main topics, which is being permanently discussed and developed to improve efficacy of networks operation.

Ring networks have largely evolved in local area computer networks (LANs). Their main benefits are: ability to add/drop local data to/from the ring at any local station while passively forwarding traffic which doesn't belong to a particular local station; efficient use of cables, for example in comparison with mesh networks; fault recovery of traffic, since two-way links between stations can be used for redirecting the traffic in case of a cable break. SDH/SONET networks have adopted these advantages to implement multi point-to-point connections within the ring. Yet, SONET/SDH ring protection is inefficient compared to packet-based protection and often creates bandwidth bottlenecks at a metro level.

Protection of traffic in ring networks is ensured by the intrinsic features of ring networks. According to the most schematic principle concept, a ring-like network is composed of two "concentric" sub-rings (a $1^{st}$ ring and a $2^{nd}$ ring) formed by network nodes interconnected via communication links and respectively enabling traffic in the ring-like network to flow in two opposite directions. In case of failure of a particular link belonging to a $1^{st}$ ring, protection of the traffic which was transmitted via the $1^{st}$ ring is performed by redirecting it, at two nodes surrounding the faulty link, so as to utilize the $2^{nd}$ ring and thus reach the required nodes "from the other side". The $2^{nd}$ ring (as well as the $1^{st}$ ring) usually reserves bandwidth for such cases and provides a so-called protection path instead of a main path section failed in the $1^{st}$ ring.

As MPLS technology becomes more and more practically demanded, it is often deployed over existing ring networks and is therefore to be protected in such networks. Fast reroute (FRR) has gained substantial traction in the vendor community and interest from service providers. It offers high speed recovery following network failures, and thereby can shorten disturbance to traffic and improve the service reliability. Fast reroute in packet-based networks brings service providers closer to the point where they can provide reliability comparable to that of TDM services like SDH/SONET or voice.

The prior art comprises some solutions for protecting MPLS traffic in various networks, and also in ring networks.

US 20030108029A1 describes a method and a system for providing failure protection in a ring network that utilizes label switching. A working label switched path (LSP, also called tunnel) between neighbor label switched routers (LSRs) in a ring network that utilizes label switching is protected by an LSP that connects the neighbor LSRs of the working LSP in an opposite direction to the working LSP. If the working LSP fails, then packets are switched to the protection LSP. Switched packets traverse the protection LSP until they reach the neighbor LSR that they would have reached had the packets traversed the working LSP. Time-to-live (TTL) values of packets that traverse the protection LSP are adjusted to account for the number of hops on the protection LSP so that the TTL values of the packets are the same after traversing the protection LSP as they would have been had they traversed the working LSP. After traversing the protection LSP packets can be switched back to the working LSP or switched to a next hop LSP. However, in case of a failure in the ring, the solution makes the traffic to pass so-called excessive portions over the main and the protection paths (as the ring networks dictate), to reach the required termination (egress) node. As a result, the solution suffers from a traffic delay, is critical to multiple faults in the ring and is inefficient from the point of bandwidth reserved for ensuring protection in the excessive portions of the ring.

US20020093954A1 describes a technique for failure protection in communication networks. A communications packet network comprises a plurality of nodes interconnected by communication links and in which tunnels are defined for the transport of high quality of service MPLS traffic. The network has a set of primary traffic paths for carrying traffic and a set of pre-positioned recovery (protection) traffic paths for carrying traffic in the event of a fault affecting one or more of the primary paths. The network incorporates a fault recovery mechanism. In the event of a fault, traffic is switched temporarily to a recovery path. The network then determines a new set of primary and recovery paths taking account of the fault. The traffic is then switched to the new primary paths. The new recovery paths provide protection paths in the event of a further fault. The network nodes at the two ends of a recovery path exchange information over that path so that packets returning to the main path present their original labels that are recognizable for further routing of those packets.

US20020060985A1 discloses a method for high speed rerouting in a multi protocol label switching (MPLS) network which can minimize a packet loss and enable a fast rerouting of traffic so as to protect and recover a multi point to point LSP occupying most LSPs in the MPLS network. The method for high speed rerouting in a multi protocol label switching (MPLS) network comprises the steps of controlling a traffic stream to flow in a reverse direction in a point where a node or link failure occurs by using a backup Label Switched Path (LSP) comprising an Explicitly Routed (ER) LSP having a reverse tree of a protected multi point to point LSP and an ingress LSR through an egress LSR. The method suffers from the drawbacks mentioned before, since it enforces the backup path to return the traffic into the ingress point of the ring where the LSP has started.

OBJECT OF THE INVENTION

It is therefore an object of the present invention to provide a method for protecting MPLS traffic in networks comprising ring-like portions and enabling fast rerouting of the traffic in case of one or more failures in the network.

Further objects and features of the invention will become apparent to those skilled in the art from the following description and the accompanying drawings.

SUMMARY OF THE INVENTION

The above object can be achieved by providing a method for protecting packets of MPLS traffic in networks comprising traffic nodes arranged in a ring-like configuration (a ring), wherein the MPLS traffic comprises one or more Label Switched Paths (LSPs) entitled to protection, and wherein each of said packets carries a label corresponding to a particular LSP. The method comprises providing the following steps in case a section extending between two nodes (edge nodes) in said ring becomes faulty:

at one edge node bordering the faulty section, redirecting the MPLS traffic in the opposite direction in the ring, via a protection path, at each particular node along said protection path, checking each specific packet belonging to the redirected MPLS traffic to determine whether the particular node is its egress point in the ring;

if in the affirmative, allowing egress of the specific packet of the redirected MPLS traffic from the protection path at said particular node, if in the negative, forwarding the specific packet of the redirected MPLS traffic to a node following said particular node in the ring.

The nodes of the ring, and in particular—the nodes of the protection path—should be understood as MPLS-switching-enabled network elements allowing ingress and/or egress of MPLS traffic into/out of the ring.

The faulty section may consist of one or more faulty nodes and/or links interconnecting the nodes.

The edge nodes may also be called redirecting nodes.

In the frame of this application, the term MPLS traffic should be understood as MPLS-like packet traffic where packets are provided with headers/labels similar to those utilized in the MPLS technology. The nodes should be understood as supporting the MPLS technology. Likewise, the protection path in the ring should be understood as MPLS-based or MPLS-enabling.

As has been mentioned, the MPLS traffic comprises a number (one or more) of LSPs (tunnels) carrying data packets. Any of the LSPs (tunnels) has its own ingress point to the ring and its own egress point from the ring. Each MPLS packet belonging to a particular LSP, is associated with a label which shall be referred to herein as "inner label". The inner label indicates the next node to which the packet is presently sent along its way to the termination point of this particular LSP. It should be noted that the termination point is not necessarily located at the ring, but may be located beyond the ring. The point (node) in the ring from which an LSP enters the ring is referred to in the specification as the LSP's ring ingress point or simply ingress point (ingress node). Likewise, the node at which the LSP leaves the ring is referred to as the LSP's ring egress point or simply egress point (egress node). The ingress points and the egress points of different LSPs usually do not coincide.

The protection path is provided in the ring network to protect LSPs in case section/s of the ring fails. It is usually pre-established for a number of LSPs in a so-called spare (protection) capacity of the ring.

It should be mentioned that in a ring comprising "n" nodes, the protection path may be formed, for example, in three different manners. One manner is to form it as a series of "n" adjacent point-to point LSPs (a ptp protection path); a second manner—to form the protection path by "n" multipoint-to point ("mptp") LSPs, each capable of collecting—but not dropping—traffic from all nodes except the one where it is terminated (an mptp protection path), and a third manner—to form the protection path by a single "circular" multipoint-to-multipoint ("mptmp") LSP that may drop/add traffic at each node (an mptmp protection path). Thus, as will be appreciated by those skilled in the art, the shape and the arrangement of the MPLS-based protection path may vary from case to case, and these various shapes and arrangements should be understood to be encompassed by the present invention.

Capacity of the protection path should be sufficient for carrying at least a part of the LSPs entitled to protection. The step of rerouting (re-directing) to the protection path can be arranged according to priorities assigned to different LSPs.

Owing to the fact that the method allows outputting the rerouted traffic from the protection path at egress node(s) of corresponding LSPs (contrary to the conventional concept of traffic protection in ring networks where the rerouted traffic can only be output from the main path at the egress node, after completing the whole way along the protection path and coming back to the main path at the node adjacent to the faulty section), the rerouted traffic will travel shorter distances in the network.

To this end, the method proposes marking the packets of each of the LSPs, when being redirected to the protection path at the first edge node, with an additional label indicating the fact that the packet is carried by the protection path in said ring. The method then comprises detecting, at each particular node of the protection path, presence of said additional label in each specific packet and, if it is present (and thus indicates that the current node may be an egress point for the packet), further comprises determining whether this node is the egress point for the LSP to which this specific packet belongs. If the node is indeed the egress point for this specific packet, the method allows egress of the specific packet from the ring. If not, the specific packet is forwarded to the next node along the protection path.

It should be noted that the method, while being started at the first edge (redirecting) node of the protection path by applying the additional label and continued at intermediate nodes of the protection path by checking the additional label, is not obligatory for performing after the second edge node of the protection path. In other words, the additional label is removed (popped) by the second edge node, and the following nodes will do the regular label check.

The different rerouted LSPs (if there are some) could tell apart by their inner labels, while the additional label indicates the fact that they are forwarded via the protection path. A number of protection paths can be known in the ring though only two (clockwise and counter clockwise) are mandatory to fully protect the traffic against a single point of failure within the ring.

The additional label is placed as an outer label in the MPLS packet label stack.

According to another embodiment of the invention, the method provided can be formulated differently, based on the characteristic feature of checking the additional label:

A method for fast rerouting packets of MPLS traffic in case of a fault in networks comprising a ring-like portion (ring), the method comprises providing the MPLS packets rerouted to a protection path with additional labels to their respective label stacks, and further comprises detecting said additional labels at nodes included in the protection path, (with or without checking an inner label, as will be explained below) to allow determining egress nodes of the rerouted MPLS packets and thereby outputting said rerouted MPLS packets at their corresponding egress nodes from the protection path.

As has been mentioned above, the MPLS traffic comprises one or more LSPs (tunnels) each being characterized by its ingress point (node) and its egress point (node) in the ring.

It should be noted that each MPLS packet carries an inner label corresponding to its LSP, and inner labels of the packets can also be checked at the nodes included in the protection path if required according to the arrangement of the protection path.

For example, in case the protection path is either of the above-mentioned ptp protection path or mptmp protection path, the method comprises performing a double lookup of labels—one lookup for the additional label that indicates that the packet is on a protection path, and the other lookup of the inner label to check whether the present node is the egress point of the LSP (or the packet is to be forwarded to the next node in the ring).

If the protection path is arranged as the mptp protection path, the method comprises checking only the additional label at intermediate nodes of the protection path to forward the rerouted packets along the ring, while doing a double lookup (checking both the additional label and the inner label) at the egress node.

Preferably, only the LSPs having higher priority (for example, those which are paid according to a higher tariff) are rerouted in case of a failure in the ring. The lower priority LSPs (tunnels) may be not rerouted at all and packets belonging to them could be dropped in case of a fault.

Further, the method is also applicable, and provides rerouting of the MPLS traffic in case the network comprises more than one ring. For example, the network may comprise a first ring network and a second ring network interconnected therebetween by at least one connecting link. In this case, each LSP may span more than one ring, and should be entitled to independent protection at each of the rings it spans.

If a fault occurs in such a second ring, the MPLS traffic is redirected in the manner similar to that in the first ring, with marking the traffic by additional labels characterizing the rerouted MPLS traffic of the second ring.

The above-described method is therefore applicable for a multi-ring network, and acquires an increased effect of fast rerouting.

In order to achieve fast rerouting (FRR) in a network with multiple rings, the Inventors further propose providing redundancy to the ring interconnection, namely providing one or more additional (protection) connecting links between the rings and using these connecting links as follows. In addition to the protection path, any LSP entitled to protection in a particular ring can be assigned a protection (backup) egress node ensuring egress from said particular ring to the protection (additional) connecting link and then to another ring.

In case of a fault in a first ring (especially when the original egress point fails or is inaccessible), packets of the LSP that have been redirected to the protection path leave the first ring through the protection (backup) egress point. The packets have their additional labels of the first ring popped and are passed via the additional connecting link with their inner labels. Reaching a first node at a second ring, the packets are preferably switched to a protection path of the next ring and acquire additional labels of the second ring, through which they eventually join the main path of the LSP in this next ring.

In general, nodes of a ring network adapted for fast rerouting of MPLS packets should be capable of applying additional labels and of performing lookup on the additional labels.

For example, nodes along the protection paths being established as either the above-mentioned ptp protection path or mptmp protection path, must provide the double lookup of labels—one lookup for the additional label that indicates that the packet is on a protection path, and the other lookup uses the inner label to check whether the present node is the egress point of the LSP (or the packet is to be forwarded to the next node in the ring). If the path is established as the mptp protection path, the double lookup must be performed at the egress node in the ring, while intermediate nodes belonging to such a path only check presence of the additional label and forward the packets towards the egress point.

Based on the above, and according to a second aspect of the invention, there is provided a network node belonging to a ring network, the node being capable of redirecting packets of MPLS-type traffic to a protection path in the ring in case a fault occurs in an adjacent link, and capable of providing said packets with an additional label indicating the redirected traffic packets in said ring, the node also being capable of processing the redirected traffic packets in the ring network upon detecting said additional label, to ensure outputting said redirected traffic packets from the ring at nodes being suitable egress nodes for said packets.

More preferably, the node should be capable of analyzing an inner label of a particular redirected traffic packet to determine its egress point. In case the egress point of the redirected traffic packet coincides with said node, the node being capable of outputting said packet from the ring (removing the additional label and pulling the packet out of the ring), while in case the egress point of the redirected traffic packet is not the current node, forwarding said packet to a next node in the ring.

Since the MPLS-type traffic may comprise one or more LSP tunnels, the node is capable of handling packets of different LSPs. To this end, the node is preferably operative to provide redirecting of LSPs to the protection path according to priorities, wherein the priorities can be set by relative importance and/or cost of different LSPs.

The invention will now be described in more details as the description proceeds.

BRIEF DESCRIPTION OF THE DRAWINGS

The invention will further be described with reference to the following non-limiting drawings related to MPLS ring networks, in which.

DETAILED DESCRIPTION OF THE INVENTION

Figure 1:
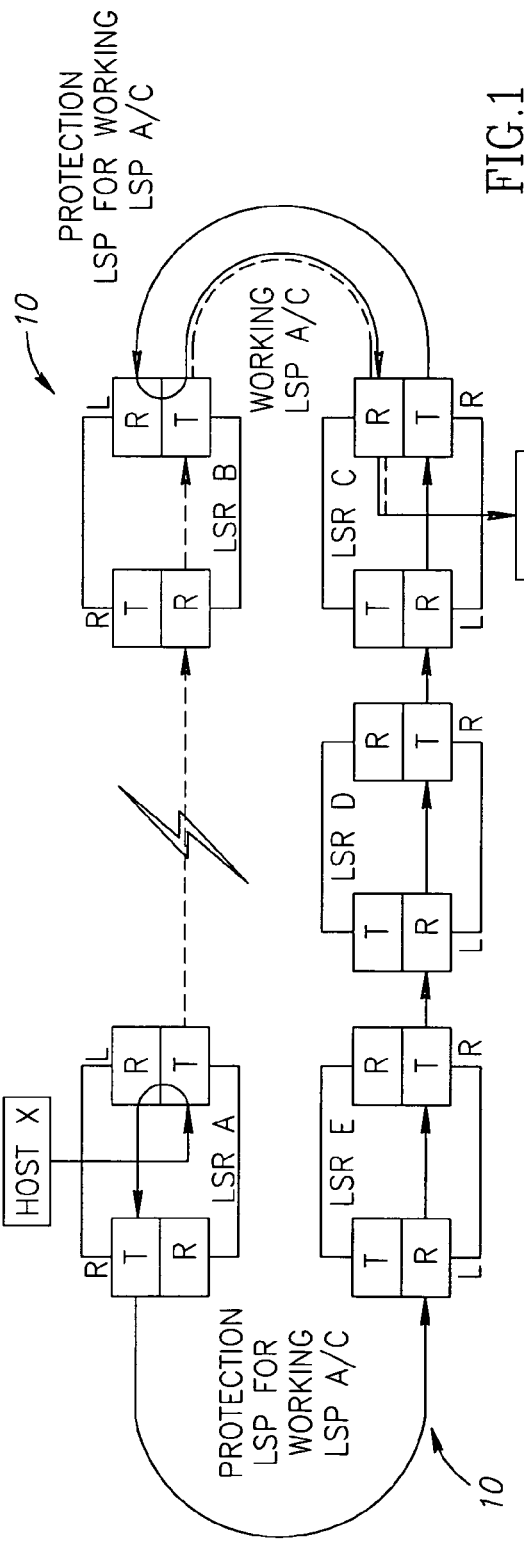
FIG. 1 schematically illustrates a known method of redirecting MPLS traffic to a protection path in case of a fault in a ring network (prior art).

FIG. 1 shows a schematic route of redirected MPLS traffic in a ring network, as known from the prior art and in particular from US 2003/0108029 A1. As can be seen from the drawing, Host X associated with node A (LSR A) of a ring network 10 was in communication (the dotted line) with Host Z associated with node C (LSR C) of the ring 10 before occurrence of a fault (such as a fiber cut, marked as a lightning) between the nodes LSR A and LSR B. The main (working) path of a particular traffic flow (LSP) between the nodes A-B-C was allocated in the inner ring, a portion of which is shown by the dotted line and indicates the working LSP. After the fault, the LSP is redirected at the node A (LSR A) to a protection LSP A-E-D-C-B allocated in the outer (protection) ring and shown with the solid line. The protection path, according to the manner accepted for ring networks, is defined as having a termination point at node B, so the traffic follows till node B without checking it at intermediate nodes. At the node B (LSR B) the protection LSP terminates, the traffic is again redirected to the main (working) ring and is transmitted as a working LSP to the LSR C and then outputted to the Host Z.

It can be noticed that the ring topology and the accepted definition of the protection path results in the extra distance the redirected traffic runs from the node LSR C to LSR B and back to LSR C, before it leaves the ring at the egress point LSR C, to the Host Z.

Figure 2:
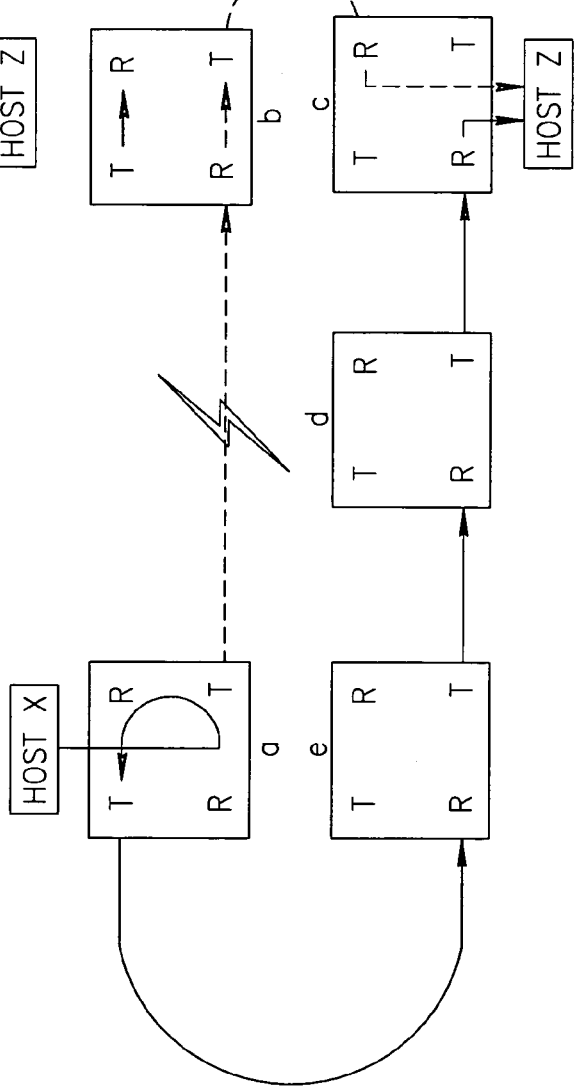
FIG. 2 schematically illustrates the proposed method of fast restoration of MPLS-like traffic in ring networks.

FIG. 2 illustrates a ring network 20 similar to the topology 10 in FIG. 1, but differing in that the nodes of the network are provided with an additional functionality to perform the method of fast rerouting of MPLS-type traffic, according to the invention. All the nodes are indicated a,b,c,d,e similar to those shown in FIG. 1. The node equipment is preferably adapted to redirect MPLS traffic based on Layer 1 alarms.

Suppose, in network 20 host X is associated with node a, host Z is associated with node c, and the main path for transmitting MPLS-type traffic is a-b-c in the clockwise direction, as shown by the dotted line. Now suppose that a similar fault situation occurs in ring network 20, namely the link a-b goes down. Node a will redirect the traffic to a protection path (indicated by a solid line), which extends between node a and node b in the counter-clockwise direction. However, the redirected traffic which is addressed to the host Z will be able to leave the ring already at the node c, without being passed up to node b and returned back to node c via the main path.

In more details, the method is explained as follows:

detecting the faulty ring section (which is between a to b in this example), at the node bordering the faulty section, applying an additional label to the MPLS packets, and redirecting them to a protection path flowing in an opposite direction to that of the original LSP, at each of the nodes participating in the protection path and traversed by the redirected traffic, making a decision whether a packet of the redirected traffic is to be forwarded further, or to be immediately outputted from the ring at the current node.

The decision is based on presence of the additional label and on the type of the protection path.

Figure 4A:
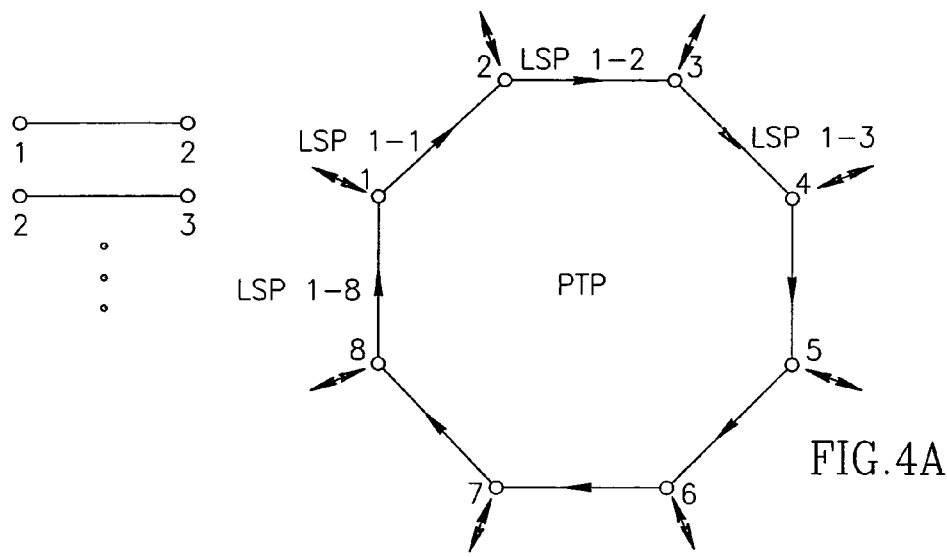
FIGS. 4a, 4b, 4c illustrate various structures of MPLS-based protection paths in a ring network.
Figure 4B:
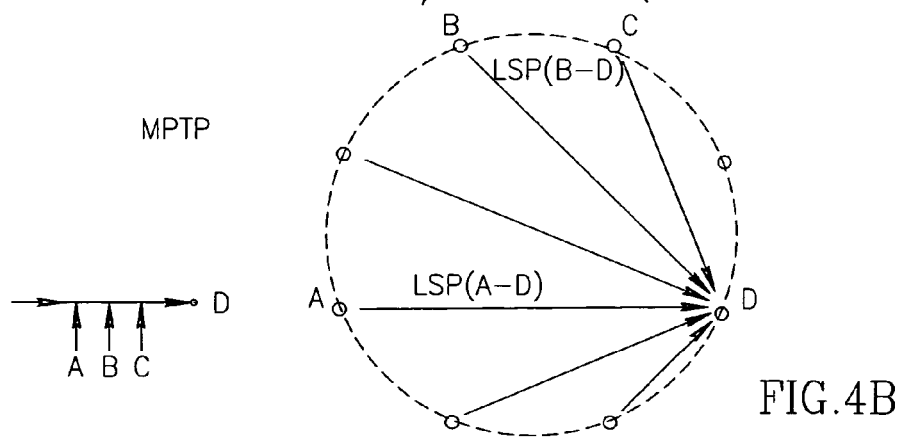
Figure 4C:
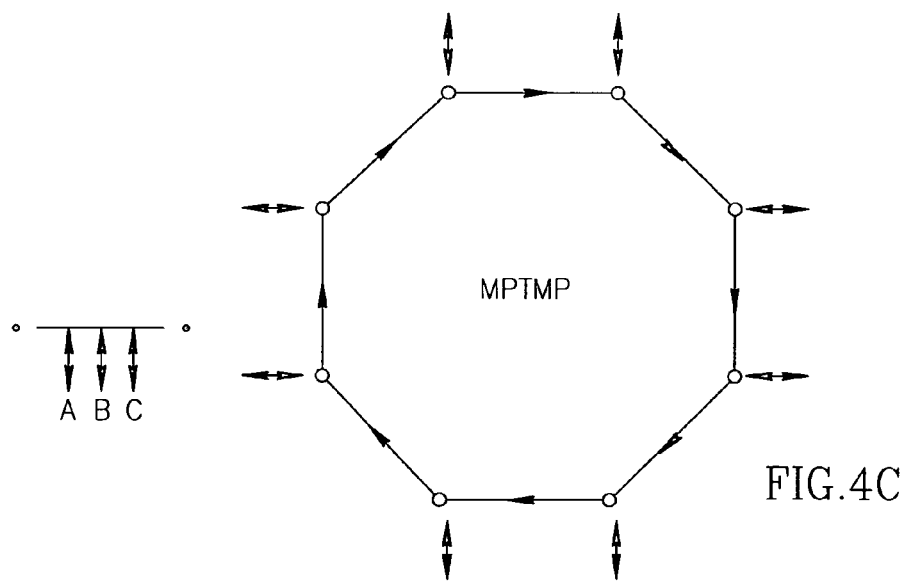

Various arrangements (types) of the protection path will be illustrated and explained with the aid of FIGS. 4a, 4b, 4c. However, it should be understood that for fast rerouting of MPLS traffic in a ring network, the protection path should preferably be established so as to allow recognizing both the protection path and the redirected traffic carried along at each node included in the protection path.

It should be kept in mind that the MPLS traffic may comprise one or more LSPs (Label Switched Paths) having different ingress and egress points and thus having different inner labels. It should also be mentioned that the protection path or tunnel is pre-selected to serve (ensure protection for) one or more LSPs entitled to protection. The decision can be made according to priorities which, for example, are stated in relation to costs of transmitting data via different LSPs. The way of performing the proposed method of fast rerouting will be further explained and illustrated with the aid of FIGS. 3, 4 and 5.

Figure 3:
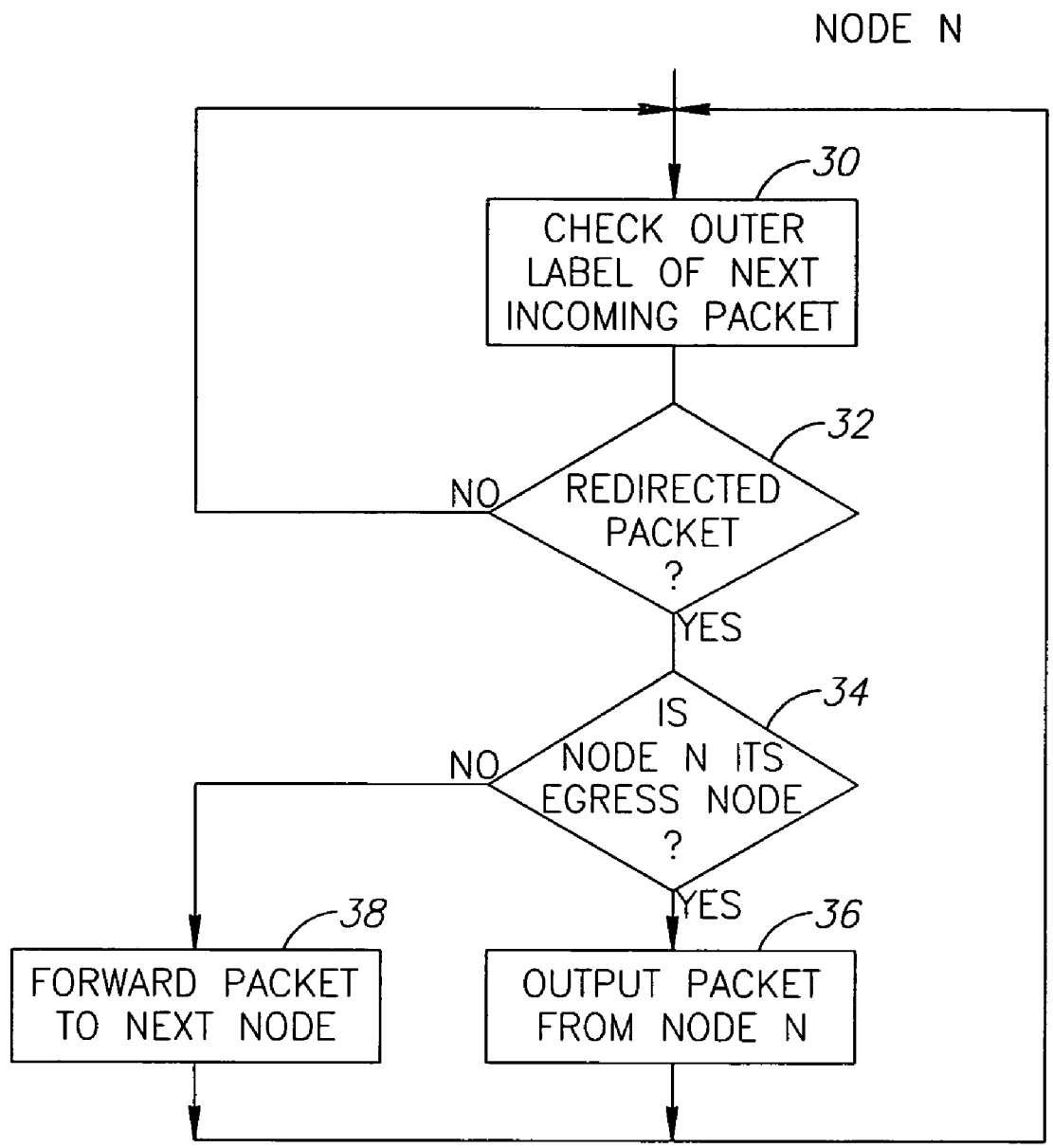
FIG. 3 is a simplified flow chart of a per node packet processing for performing lookup of MPLS labels along the protection path.

FIG. 3 is a simplified flow chart of the proposed algorithm for fast rerouting, according to the proposed method.

Node N checks the outer MPLS label of each data packet passing through the node in both directions—block 30. If the node detects, at any packet, presence of an outer (additional) label marking a protection path (block 32), it is to be checked whether the node N is the egress node for the particular redirected LSP for which this packet belongs (block 34). If the protection path is arranged according to the multipoint-to-point "mptp" principle (see FIG. 4b), the protection path has one egress point, thus a node automatically forwards the re-directed traffic if it is not the egress point (block 38), without checking the inner label, or outputs the re-directed traffic based on the inner label if it is the egress point (block 36).

In other cases (see for example FIGS. 4a and 4c for arrangement of the protection path) node N performs more complex operations in the frame of block 34, namely double MPLS label lookups at each node along the protection path. Upon detecting the additional label, a further check up of the label stack must be performed. The second look-up scans the inner LSP identification label from the packet (say, LSP 100) and checks whether it is the egress point of the LSP 100. If yes, (block 36), the packet should be directly outputted from the node N. If not, the packet will be forwarded to the next node in the ring (block 38).

FIG. 4a schematically shows a protection path in an 8-node ring formed by 8 point-to-point (ptp) LSPs each of which spans only two nodes. To find the egress node of a packet traversing in a protection path, a double lookup is performed at each node in the ring: the first lookup for detecting an additional label representing the protection path, and the second lookup is done on the inner label for determining whether the current node is the egress node of the protected LSP. In any arrangement, when this answer is positive, it should also be known what's the specific interface to which the packet should be sent.

FIG. 4b schematically shows a protection path in an 8-node ring formed by 8 multipoint to point (mptp) LSPs (only one such LSP is shown). Each of the LSPs can collect MPLS traffic from 7 nodes (say, in the clockwise direction) and drop it at the $8^{th}$ node where it is terminated. To find the egress node of a packet traversing in a protection path, a double lookup is performed only at the termination point of the mptp LSP: the first lookup for detecting an additional label representing the protection path, and the second lookup is done on the inner label for determining the specific interface to which the packet should be sent.

FIG. 4c schematically shows a protection path in an 8-node ring formed by a single multipoint to multipoint (mptmp) LSP that can collect and drop MPLS traffic from each node. To find the egress node of a packet traversing in a protection path, a double lookup is performed at each node: the first lookup for detecting an additional label representing the protection path, and the second lookup is done on the inner label for determining whether the current node is the egress node of the protected LSP, and if so—what's the specific interface to which the packet should be sent.

Figure 5:
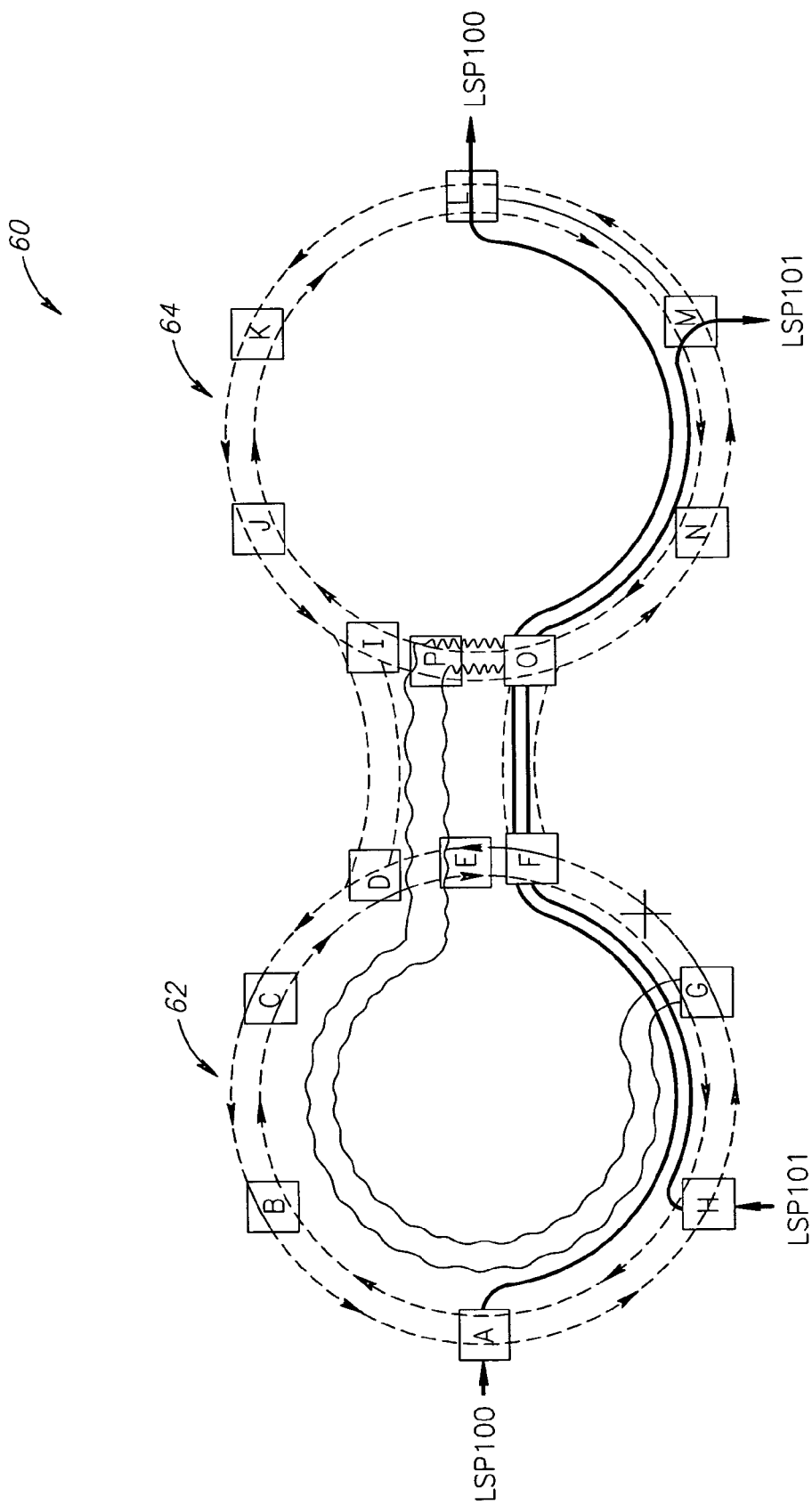
FIG. 5 schematically illustrates a multi-ring network adapted for fast restoration of MPLS traffic according to the invention.

FIG. 5 illustrates how the method can be applied to ring(s) carrying a number of LSPs, and to a network comprising more than one ring formed by nodes provided with the proposed inventive functionality.

A network 60 comprises a first ring 62 (having nodes A to H and a second ring 64 (having nodes I to O), interconnected there-between with two connecting links D-I and F-O. Each of the rings, as usual, has a clockwise sub-ring and a counter-clockwise sub-ring; the sub-rings are shown by dotted links with arrows interconnecting the nodes. Suppose, that two LSPs span the network 60: LSP 100 and LSP 101. The main (original) tunnels of the two LSPs are shown by thick solid lines; the LSPs 100 and 101 have different ingress points in the ring 62, the same egress point in the ring 62, one ingress point in the ring 64 and different egress points in the ring 64. The main tunnels of LSPs 100 and 101 only partially coincide; they both are arranged in the counter-clockwise sub-rings in rings 62 and 64.

Suppose, that node F goes down. The LSPs 100 and 101 are to be rerouted so as to reach the ring 64. Let us assume that a protection path in the clockwise sub-ring of the ring 62 is pre-assigned. First, the conventional step of redirecting at the node G is performed, i.e., both of the LSPs are redirected in the clockwise direction (they are shown with the wavy lines). An additional label is applied to the redirected traffic at the edge node G. A backup egress point is predetermined, and has priority over the original egress node F for the rerouted traffic. In this example, the backup egress point is the node D. The redirected LSPs will then be outputted from the ring 62 through node D instead of their original egress node F.

In the connecting link DI, the redirected traffic packets (redirected LSPs 100 and 101) have their additional labels removed. Node I in ring 64 is configured to redirect packets of LSPs 100 and 101 to the protection path of ring 64 and provide them with an additional label (preferably, representing the counter-clockwise protection path of ring 64). These packets will thus travel in counter-clockwise direction from node I to node O, where they will have their additional labels removed, and join the main paths of LSPs 100 and 101 accordingly.

It should be appreciated that though the invention has been described with reference to the presented examples, other arrangements can be proposed in the frame of the inventive concept, The concept will be defined below in the following claims.

The invention claimed is:

1. A method for protecting packets of MPLS traffic in ring networks comprising a ring having a plurality of nodes, in case when a section extending between at least two nodes of said ring becomes faulty, wherein the MPLS traffic comprises two or more Label Switched Paths (LSPs) entitled to protection, and wherein each of said packets carries an original label corresponding to a specific LSP, the method comprising:
   at a first edge node bordering the faulty section, redirecting the MPLS traffic in the opposite direction along the ring, via a shared protection path;
   when being redirected to the protection path at the first edge node, providing each of the redirected packets with an additional, outer label to its label stack, said additional label indicating the fact that the packet is carried along the protection path;
   recognizing the packets belonging to the redirected MPLS traffic by detecting, at the protection path nodes presence of said additional label;
   for each packet arriving at a particular node along said protection path and recognized as belonging to the redirected MPLS traffic by detecting said additional label, determining whether the particular node is the packet's egress point from the ring,
   said determining being performed depending on arrangement of the protection path:
      in case said protection path is arranged as a chain of point-to point LSPs (a point-to-point, ptp, protection path) or multipoint-to-multipoint (mptmp) protection path, the determining comprises mandatory checking the original, inner label of the packet at the particular node,
      in case said protection path is arranged as a multipoint-to-point (mptp) protection path, the determining comprises checking the original, inner label of the packet if said particular node is a termination point of said mptmp protection path,
   the method then comprises
   allowing egress of said packet of the redirected MPLS traffic from the ring at said particular node, if said particular node is either the termination point of the mptp path or the packet's egress node from the ptp or mptmp protection path,
   forwarding said packet of the redirect MPLS traffic to a next node along the ring, said particular node is neither the termination point of the mptp protection path nor the packet's egress node from the ptp or mptmp protection path.

2. A method for fast rerouting, in case of a fault, packets of MPLS traffic formed by two or more Label Switched Paths (LSPs) entitled to protection in networks comprising a ring having a plurality of nodes, wherein said packets carry original labels respectively corresponding to said two or more LSPs, and wherein said fault appears in a section extending between at least two nodes of said ring, the method comprising:
   rerouting the MPLS packets to a protection path in the ring, said protection path serving a shared protection path for said two or more LSPs and having one or more egress points,
   providing the rerouted MPLS packets with additional labels to their respective label stacks,
   detecting said additional labels at all nodes included in the protection path, and checking the original labels of the respective rerouted MPLS packets at all said one or more egress points of the shared protection path, to further allow determining egress nodes for the rerouted MPLS packets and thereby outputting said rerouted MPLS packets at their corresponding egress points from the protection path of the ring.

3. The method according to claim 1 or 2, comprising preliminary establishing said shared protection path in a protection capacity of said ring, according to point-to-point, multipoint-to-multipoint, or multipoint-to-point arrangement.

4. The method according to claim 1 or 2, comprising:
   pre-establishing said protection path, based on Layer 1 alarms, detecting said fault in a faulty section between a first edge node and a second edge node in the ring,
   at each of the nodes participating in the protection path and traversed by the redirected traffic, making a decision whether a packet of the redirected traffic is to be forwarded further, or to be immediately outputted from the ring at said node being the packet's egress node.

5. The method according to claim 1 or 2, wherein the step of re-directing to the protection path is arranged according to priorities assigned to different said LSPs.

6. The method according to claim 1 or 2, for rerouting the MPLS traffic in a network comprising at least a first ring network and a second ring network, each respectively enabling the MPLS traffic in two opposite directions and interconnected there-between by a connecting link and an additional connecting link, wherein at least one of said LSPs spans both the first ring network and the second ring network and is entitled to protection at each of the ring networks said at least one of said LSPS spans, the method further comprising assigning said at least one LSP, entitled to protection in a first ring network, a backup egress point ensuring egress from said first ring network to the additional connecting link, to allow packets of said at least one LSP, if redirected to the protection path of the first ring network due to a fault to leave the first ring network through the backup egress point and reach the second ring network via the additional connecting link.

7. The method according to claim 6, further comprising merging the redirected packets of said at least one LSP, when reaching the second ring network, to the original path of said packets in the second ring network before the fault in the first ring network.

8. The method according to claim 1 or 2, wherein the nodes of the ring are MPLS-switching-enabled nodes.

9. A network node suitable for operating in a ring network configured for handling and protecting traffic based on MPLS switching, wherein said node is configured to redirect packets of MPLS traffic, each carrying an original label, from a working path to a protection path in the ring in case a fault is detected in an adjacent link or an adjacent node, providing each of said packets with an additional, outer label indicating the redirected traffic packets in said ring, and wherein said node is also configured to process each packet of the traffic packets being redirected in the ring network, upon detecting said additional label and according to a type of arrangement of the protection path, as follows:

if said network node is an egress point of the protection path, checking the original label of the packet, if said network node is not an egress point of the protection path, forwarding the packet to a next node along the protection path, in order to ensure outputting said redirected traffic packets from the ring at nodes being suitable egress points for said packets.

10. The network node according to claim 9, being further configured to determine whether said network node is the suitable egress point for a redirected packet as follows:

in case said protection path is arranged as a chain-like point-to-point (ptp) protection path or a multipoint-to-multipoint (mptmp) protection path, said network node being operative to mandatorily cheek the original, inner label of the packet to found out the packet's egress node, in case the protection path is arranged as a multipoint-to-point (mptp) protection path, network node being operative to check the original, inner label of the packet to find the packet's egress node only if said network node is a termination point of said mptmp protection path, the network node being further operative to allow outputting of said packet, if said network node is the packet's egress node either from the mptp protection path or from the ptp or mptmp protection path, and allow forwarding said packet to a next node along the protection path, if said network node is neither the termination point of the mptp protection path nor the packet's egress node from the ptp or mptmp protection path.

11. The network node according to claim 9, wherein said node is configured to handle the MPLS traffic packets belonging to different Label Switched Paths (LSPs) and operative to provide redirecting packets of said LSPs to the protection path according to predetermined priorities.

\* \* \* \* \*